United States Patent
Horvath et al.

(10) Patent No.: US 10,776,928 B1
(45) Date of Patent: Sep. 15, 2020

(54) EFFICIENT EGOMOTION ESTIMATION USING PATCH-BASED PROJECTED CORRELATION

(71) Applicant: HRL Laboratories, LLC, Malibu, CA (US)

(72) Inventors: Andras Horvath, Budapest (HU); Shankar Rao, Agoura Hills, CA (US)

(73) Assignee: HRL Laboratories, LLC, Malibu, CA (US)

(*) Notice: Subject to any disclaimer, the term of this patent is extended or adjusted under 35 U.S.C. 154(b) by 0 days.

(21) Appl. No.: 16/532,970

(22) Filed: Aug. 6, 2019

Related U.S. Application Data (60) Provisional application No. 62/746,123, filed on Oct. 16, 2018.

(51) Int. Cl.
| | |
|---|---|
| H04N 7/18 | (2006.01) |
| G06K 9/00 | (2006.01) |
| G06T 7/20 | (2017.01) |
| G06T 7/174 | (2017.01) |
| G06T 7/13 | (2017.01) |

(52) U.S. Cl.
CPC ............... *G06T 7/20* (2013.01); *G06T 7/13* (2017.01); *G06T 7/174* (2017.01); *G06T 2207/20021* (2013.01)

(58) Field of Classification Search
USPC ....... 382/100, 103, 106–107, 155, 162, 168, 382/173, 181, 199, 206, 219, 224, 254, 382/276, 285–291, 305, 317; 348/148, 348/154, 155; 345/419
See application file for complete search history.

(56) References Cited

U.S. PATENT DOCUMENTS

| | | | | |
|---|---|---|---|---|
| 7,616,807 | B2 * | 11/2009 | Zhang | G06T 7/246 345/419 |
| 9,866,748 | B2 * | 1/2018 | Sivan | H04N 19/597 |
| 2013/0070962 | A1 * | 3/2013 | Yankun | G06T 7/254 382/103 |

(Continued)

FOREIGN PATENT DOCUMENTS

| | | |
|---|---|---|
| KR | 10-2018-0112014 | 10/2018 |
| WO | 2017157799 | 9/2017 |

OTHER PUBLICATIONS

D. Lowe, "Distinctive Image Features from Scale-Invariant Keypoints" IJCV, 60(2) pp. 1-28, 2004.

(Continued)

*Primary Examiner* — Seyed H Azarian
(74) *Attorney, Agent, or Firm* — Ladas & Parry (57) ABSTRACT

A method for improving computational efficiency for egomotion estimation includes detecting a pair of consecutive images, and estimating a rotation angle and a two dimensional translation vector that best models the motion between the image frames. The pair of images are each divided into overlapping image patches, and then an efficient projected correlation approach is used to estimate a local two dimensional translation vector for each image patch. The translation vectors from all the patches form a vector field, and then trimmed-mean method is used to robustly and efficiently estimate the rotation angle and the two dimensional translation that best models the egomotion of the detector, which may be a camera.

23 Claims, 6 Drawing Sheets

(56) References Cited

U.S. PATENT DOCUMENTS

2014/0049644 A1* 2/2014 Deigmoeller ........... G06T 7/215
348/148
2014/0161323 A1 6/2014 Livyatan et al.
2017/0308998 A1* 10/2017 Wang ...................... G06T 7/248
2018/0268237 A1 9/2018 Stanimirovic et al.

OTHER PUBLICATIONS

H. Bay, A. Ess, T. Tuytelaars, and L. Van Gool, "Speeded-Up Robust Features (SURF)" Computer Vision and Image Understanding (CVIU), vol. 110, No. 3, pp. 346-359, 2008 (Available online Dec. 15, 2007).
M. Fischler and R. Bolles, "Random Sample Consensus: a Paradigm for Model Fitting with Applications to Image Analysis and Automated Cartography" Communications of the ACM, vol. 24, No. 6, pp. 381-395, 1981.
R. Gonzalez and R. Woods, "Digital Image Processing" Addison Wesley, 1992, pp. 413-428.
J. Canny, "A Computational Approach to Edge Detection" IEEE Trans. Pattern Analysis and Machine Intelligence, 8(6):679-698, 1986.
J. P. Lewis, "Fast template matching" Proc. Vision Interface. pp. 1-4 (1995).
R. Hartley, "In Defense of the Eight-Point Algorithm" IEEE Trans. on Pattern Anal. and Mach. Int. (PAM I), vol. 19., No. 6, pp. 580-593, 1997).
P. Huber, "Robust Statistics" John Wiley & Son, Inc., New York, (1981), section 1.3, pp. 7-10.
Wang, X. R., and Y. Ding, "An Image Registration Algorithm Based on Fourier-Mellin Transform and Feature Point Matching" Multimedia, Communication and Computing Application: Proceedings of the 2014 International Conference on Multimedia, Communication and Computing Application (MCCA 2014), Xiamen, China, Oct. 16-17, 2014. CRC Press, (2015), pp. 207-216.
H. Bay, T. Tuytelaars, and L. Van Gool, "SURF: Speeded up Robust Features" Computer Vision — ECCV 2006. ECCV 2006. Lecture Notes in Computer Science, vol. 3951, pp. 1-14.
Y. Poleg, et al., "Temporal Segmentation of Egocentric Videos" The IEEE Conference on Computer Vision and Pattern Recognition (CVPR), 2014, pp. 1-8.
Written Opinion of the International Searching Authority in International Application No. PCT/US2019/045534, dated Dec. 4, 2019.
International Search Report in International Application No. PCT/US2019/045534, dated Dec. 4, 2019.

* cited by examiner

EFFICIENT EGOMOTION ESTIMATION USING PATCH-BASED PROJECTED CORRELATION

CROSS REFERENCE TO RELATED APPLICATIONS

This application is related to and claims the benefit of U.S. Provisional Patent Application Ser. No. 62/746,123, filed on Oct. 16, 2018, which is incorporated herein by reference as though set forth in full.

STATEMENT REGARDING FEDERAL FUNDING

This invention was made with U.S. Government support. The U.S. Government has certain rights in this invention.

TECHNICAL FIELD

This disclosure relates to egomotion estimation and feature detection in images.

BACKGROUND

Prior Art approaches for egomotion estimation usually involve detection of persistent features across images, such as described by D. Lowe in "Distinctive Image Features from Scale-Invariant Keypoints," IJCV, 60(2) pp 91-110, 2004, which is incorporated herein by reference and which describes using a scale-invariant feature transform (SIFT), and by H. Bay, A. Ess, T. Tuytelaars, and L. Van Gool, in "Speeded-Up Robust Features", in Proc. of European Conference on Computer Vision, 2006, which is incorporated herein by reference. These prior art approaches are computationally intensive for detection, and features may not persist across images due to variations in illumination, changing weather conditions, or occlusions. Such features are often matched with corresponding features in the next image frame using random sampling techniques, such as RANSAC, as described by M. Fischler and R. Bolles in "Random Sample Consensus: A Paradigm for Model Fitting with Applications to Image Analysis and Automated Cartography", Communications of the ACM, Vol. 24, No. 6, pp. 381-395, 1981), which is incorporated herein by reference. Such random sampling approaches, which are theoretically guaranteed to robustly estimate a motion model given enough random samplings, often require far too many random samplings to be computationally tractable in real time for low power platforms, such as unmanned autonomous vehicles.

Another "holistic" egomotion method based on the Fourier-Mellin (F-M) transformation, uses properties of geometric transformations in the spectral domain to effectively estimate a motion model for the scene. However, this approach requires computation of a two dimensional (2-D) Fourier Transform of the whole image, which is a computationally expensive operation, and which is not robust to outliers in the generic method. While the F-M based approach can be made more robust, using techniques like random sampling or a trimmed-mean approach, these techniques increase the already high computational cost and make real-time operation on a low power platform infeasible.

What is needed is a computationally efficient apparatus and method for egomotion estimation. The embodiments of the present disclosure answer these and other needs.

SUMMARY

In a first embodiment disclosed herein, a method for improving computational efficiency for egomotion estimation comprises detecting a first image, detecting a second image, wherein the second image is detected at a time after detecting the first image, forming a first edge detected image from the first image, forming a second edge detected image from the second image, dividing the first edge detected image into a first set of first edge detected image patches, dividing the second edge detected image into a second set of second edge detected image patches, wherein the second edge detected image is divided into the second set of second edge detected image patches in the same manner as the first edge detected image is divided into the first set of first edge detected image patches, determining a local translation vector for each corresponding pair of a respective first edge detected image patch and a respective second edge detected image patch by computing correlations between projections of the respective first edge detected image patch onto a first respective vertical axis and a first respective horizontal axis and the respective second edge detected image patch onto a second respective vertical axis and a second respective horizontal axis to derive a set of local translation vectors, determining a center of rotation from the set of local translation vectors, using the center of rotation to estimate a local rotation angle for each local translation vector, estimating a global rotation angle by using the local rotation angles and the corresponding local translation vectors, and estimating egomotion by calculating a two dimensional translation vector between the second image and the first image.

In another embodiment disclosed herein, a device for improving computational efficiency for egomotion estimation of a moving platform comprises a camera mounted on the platform, the camera detecting a first image and detecting a second image, wherein the second image is detected at a time after detecting the first image, and a processor coupled to the camera, the processor configured to: form a first edge detected image from the first image, form a second edge detected image from the second image, divide the first edge detected image into a first set of first edge detected image patches, divide the second edge detected image into a second set of second edge detected image patches, wherein the second edge detected image is divided into the second set of second edge detected image patches in the same manner as the first edge detected image is divided into the first set of first edge detected image patches, determine a local translation vector for each corresponding pair of a respective first edge detected image patch and a respective second edge detected image patch by computing correlations between projections of the respective first edge detected image patch onto a first respective vertical axis and a first respective horizontal axis and the respective second edge detected image patch onto a second respective vertical axis and a second respective horizontal axis to derive a set of local translation vectors, determine a center of rotation from the set of local translation vectors, use the center of rotation to estimate a local rotation angle for each local translation vector, estimate a global rotation angle by using the local rotation angles and the corresponding local translation vectors, and estimate egomotion by calculating a two dimensional translation vector between the second image and the first image.

In yet another embodiment disclosed herein, a method for improving computational efficiency for egomotion estimation comprises detecting a pair of consecutive images with a moving detector, edge detecting the pair of consecutive images, dividing each of the pair of edge detected consecutive images into corresponding image patches, using a projected correlation of corresponding image patches to estimate a local two dimensional translation vector between each corresponding image patch, using the local two dimensional translation vector between each corresponding image patch and trimmed-mean to derive a rotation angle and a two dimensional translation vector to estimate an egomotion of the detector.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 2A and 2B show examples of the projected edge maps for FIG. 1B on the X and Y axes, respectively, and FIGS. 2C and 2D show examples of the projected edge maps for FIG. 1D on the X and Y axes, respectively, in accordance with the present disclosure;

FIGS. 4A and 4B show example qualitative results, FIG. 4A showing a difference between a current frame and a previous frame after transformation using a single global translation in accordance with the prior art.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The invention of the present disclosure takes a pair of consecutive images from a moving camera and estimates the rotation angle and the 2-D translation vector that best models the camera motion between the image frames. This "egomotion estimation" is performed by breaking the pair of images into grids of overlapping patches, using an efficient projected correlation approach to estimate a local 2-D translation vector for each image patch, grouping together the vectors from all image patches to obtain a vector field, and then using a trimmed-mean method to robustly and efficiently estimate the rotation angle and the 2-D translation that best models the camera motion.

By modelling the motions within patches as 2-D translations, the invention of the present disclosure performs the egomotion estimation of the whole image much more efficiently than prior art approaches based on feature detection as described by D. Lowe in "Distinctive Image Features from Scale-Invariant Keypoints," IJCV, 60(2) pp 91-110, 2004, which describes a scale-invariant feature transform (SIFT), and/or random sampling (RANSAC) as described by M. Fischler and R. Bolles in "Random Sample Consensus: A Paradigm for Model Fitting with Applications to Image Analysis and Automated Cartography", Communications of the ACM, Vol. 24, No. 6, pp. 381-395, 1981), which are incorporated herein by reference.

The projected correlation used to estimate the local 2-D translation vectors is applied to patches, which may, for example, be patches with 256×256 pixels, and reduces the 2-D image matching problem to a 1-D correlation problem between vectors. Despite its computational efficiency, the patch-based approach is also highly robust, enabling the correct rotation angle and the correct translation vector for whole images to be estimated despite objects moving in the scene that violate the global motion model as well as individual local translation vectors having gross errors.

The improved egomotion estimation provided by this invention directly enables improved automated control and improved performance in higher-level processing. For example, using the present invention with a gyroscope or similar control system, the invention may be used to keep an object or target at the center of the field of view despite the motion of a camera. Alternatively, this invention can be used in an image processing pipeline for wide area detection and recognition of multiple objects. The improved egomotion estimation provided by this invention results in an improved motion channel input to the image processing pipeline, which results in more accurate detection and recognition of objects whose motion differs from the camera motion.

The patch-based projected correlation approach of the present invention does not rely on feature detection and matching, instead estimating a local translation vector efficiently from all of the pixels in the image patch. This enables the present invention to be more robust to variations in illumination, weather conditions, and occlusions compared to feature based approaches. In a reduction to practice, it has been seen that the estimated local 2-D translation vectors are remarkably consistent with one another, enabling the use of a lighter weight, more computationally efficient robust estimation method, which for example may be the trimmed mean of the motion model for the whole image.

The following practical assumptions are made about a pair of consecutive image frames in order to efficiently and effectively estimate the egomotion of the camera between the two frames.

First, it is assumed that the consecutive images only differ by 2-D rotation and translation. That is, changes of scale as well as 3-D perspective effects are negligible.

Second, it is assumed that the maximum amount of translation between consecutive images is known. In practice, this can be calculated from the speed and orientation of the platform, such as the speed of an aerial platform and its distance to the ground.

Third, it is assumed that the maximum amount of the rotation between consecutive images is known. The present invention has been empirically observed to operate effectively when the rotation angle between consecutive images is less than 20 degrees. This is a reasonable assumption to make for consecutive image frames captured from a camera with a sufficient frame rate, for example a frame rate greater than 30 frames/second.

Fourth, it is assumed that the rotation happens around a known point on the image. For example, in a reduction to practice, it has been assumed that the rotation is around the optical center point.

Figure 1A:
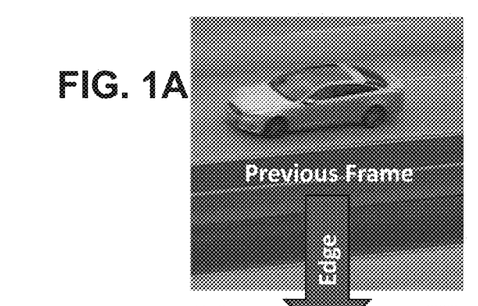
FIGS. 1A and 1C show an example pair of consecutive images from an imager, and FIGS. 1B and 1D, respectively, show their corresponding edge images in accordance with the present disclosure.
Figures 1B, 2A, 2B:
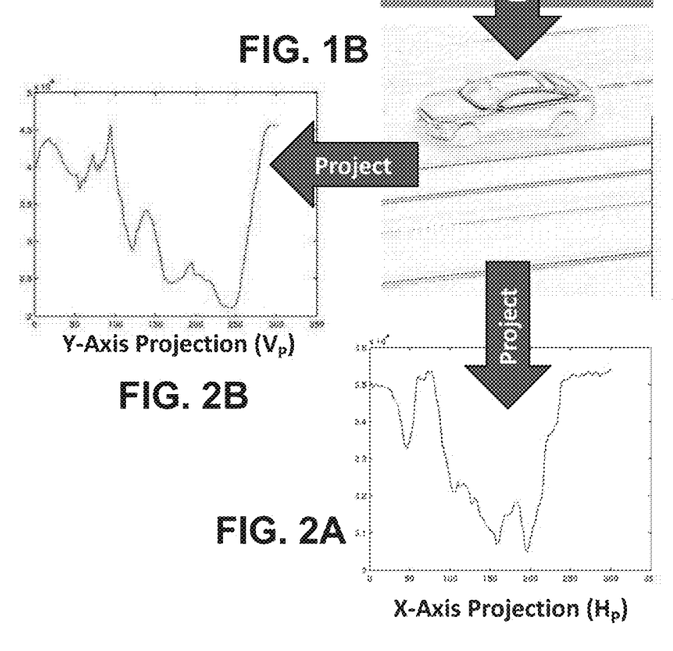
Figure 1C:
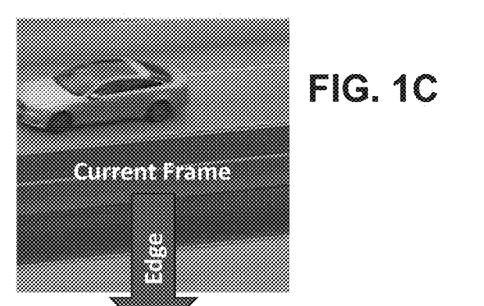
Figures 1D, 2C, 2D:
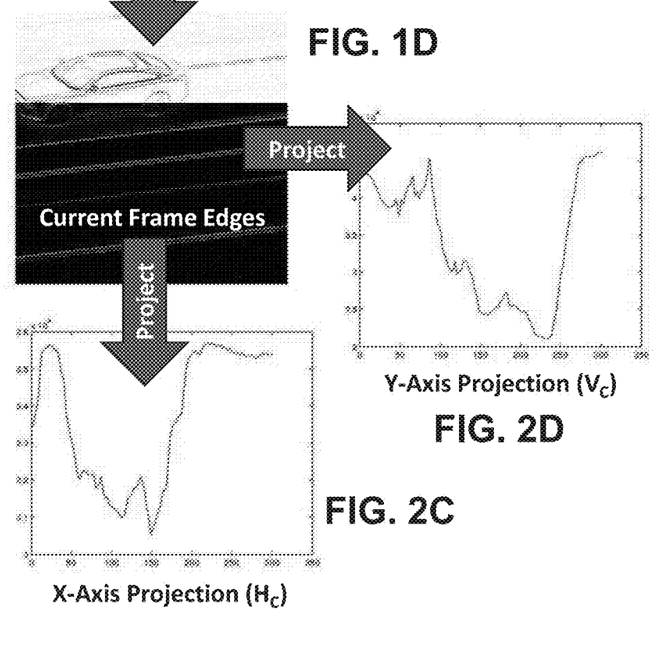

The consecutive input images, as shown in FIGS. 1A and 1C, are first transformed into edge images, as shown in FIGS. 1B and 1D, respectively. For example, the current image C(x,y), as shown in FIG. 1C, is transformed into the edge image as shown in FIG. 1D, and the previous image P(x,y), as shown in FIG. 1A is transformed into the edge image, as shown in FIG. 1B. To transform the images into an edge image, an edge operator E(·) is used. The edge operator may be an edge detection method using an image gradient, such as described by R. Gonzalez and R. Woods in Digital Image Processing, Addison Wesley, 1992, pp 414-428, which is incorporated herein by reference and which has been used in a reduction to practice. Alternatively, an edge detection method, such as described by J. Canny, A Computational Approach To Edge Detection, IEEE Trans. Pattern Analysis and Machine Intelligence, 8(6):679-698, 1986, which is incorporated herein by reference, may be used. The application of the edge operator E(·) results in a sparse representation, which helps calculation and makes it easier to identify rotation in this domain.

Figure 7A:
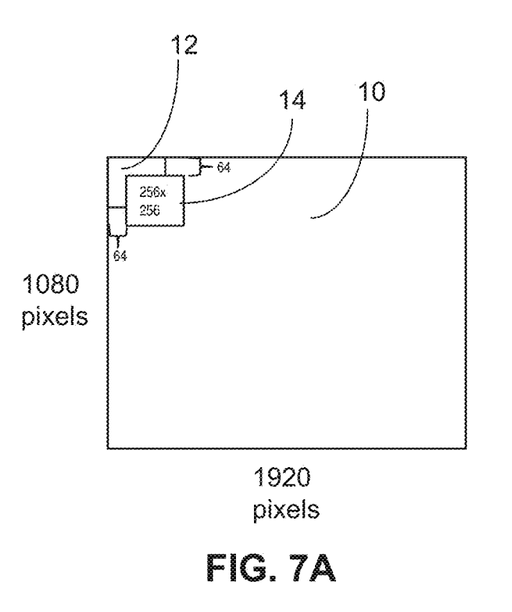
FIG. 7A shows example overlapped image patches for a current edge detected image.
Figure 7B:
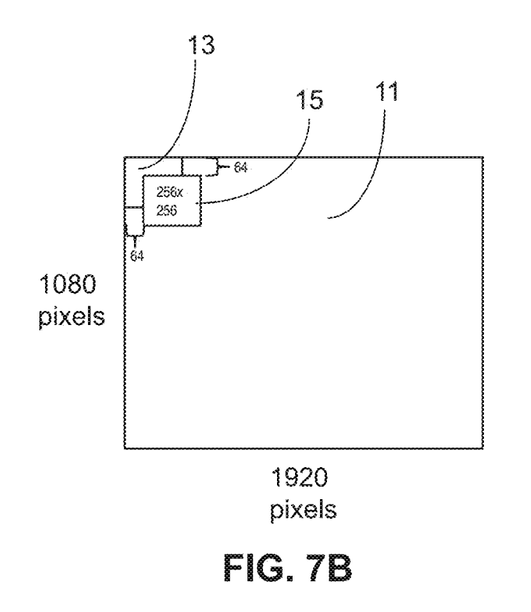
FIG. 7B shows example overlapped image patches for a previous edge detected image in accordance with the present disclosure.

Then the edge images, such as the edge images in FIGS. 1B and 1D, are divided into patches, which may be overlapped and may be along a predefined grid. In a reduction to practice, a regular grid has been used; however, the measurements can potentially be taken with patches at any position. In one example, the edge images may have high definition (HD) resolution. For example, the edge images of FIG. 1B and FIG. 1D may have a size of 1080×1920 pixels, as shown for example in current edge image 10 shown in FIG. 7A and in previous edge image 11 shown in FIG. 7B. The image patches, for example image patches 12 and 14 in FIG. 7A and image patches 13 and 15 in FIG. 7B, may have a size of 256×256 pixels with a stride of 64×64 pixels between image patches, so that the image patches have a 75% overlap or 192 pixel overlap in the x-direction and a 75% overlap or 192 pixel overlap in the y-direction, as shown in FIGS. 7A and 7B. In this example, both the previous frame edges (FIG. 1B) and the current frame edges (FIG. 1D) would each have a 13×27 grid of image patches or a set of 351 patches over the high definition (HD) resolution image of 1080×1920 pixels. The patches in within these two sets may be paired according their corresponding offsets within the larger images.

Figure 3:
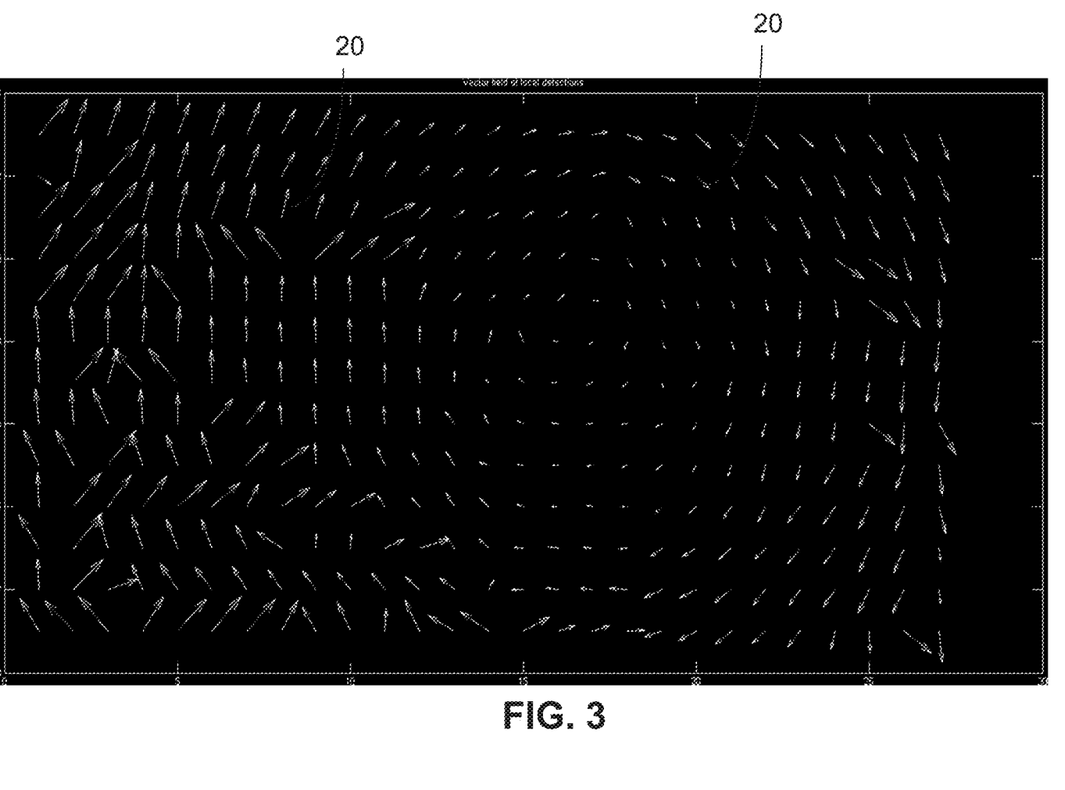
FIG. 3 shows an example set of translation vectors in accordance with the present disclosure.

Next, relative displacements are calculated between the corresponding pairs of image patches obtained from the previous frame and current frame edge images. This results in a local translation vector for each of the 338 pairs of edge image patches or grid positions, such as obtained from the edge images of FIGS. 1B and 1D. An example of the resulting set of translation vectors is shown in FIG. 3.

The local translation vector for each of the image patch pairs is estimated by computing correlations between projections of the edge detected image patches onto the X- and Y-axes, as for example, shown in FIGS. 2A and 2B, respectively, for one of the previous image patches, such as image patch 15 shown in FIG. 7B, or FIGS. 2C and 2D for one of the current image patches, such as image patch 14 shown in FIG. 7A.

The horizontal x and vertical y projections of the image patches, for example for the edge map of FIG. 1B, as shown in FIGS. 2A and 2B, respectively are calculated for each image patch. For a patch $P_k$ the horizontal and vertical projections for the patch are defined by the following equations where $V_{pk}$, $H_{pk}$, are vertical and horizontal projections of a k'th patch from a previous edge image, and $V_{ck}$, $H_{ck}$ are vertical and horizontal projections of a corresponding k'th patch $C_k$ from a current edge image.

$$V_{Pk}(y) = \sum_x E(P_k(x, y))$$

$$H_{Pk}(x) = \sum_y E(P_k(x, y))$$

$$V_{Ck}(y) = \sum_x E(C_k(x, y))$$

$$H_{Ck}(x) = \sum_y E(C_k(x, y)).$$

The projection calculation for the patches may be optimized by using a method described by J. P. Lewis in *Fast template matching. Proc. Vision Interface*. pp. 120-123 (1995), which is incorporated herein by reference. By indexing out four points from the integral image, the sum of a rectangular area in the integral image can be obtained without explicitly summing each element.

The horizontal edge X- and vertical edge Y-projections at any rectangular region or image patch from the integral image are derived for both the current and the previous image, as shown, for example, in FIGS. 2A and 2B, respectively for one of the previous image patches, such as image patch 15 shown in FIG. 7B, or FIGS. 2C and 2D for one of the current image patches, such as image patch 14 shown in FIG. 7A. Then a 2-D translation is estimated that maximizes the correlation between the X- and Y-axes vectors for corresponding image patches in the current and previous images. The correlations are calculated between corresponding image patches in the current and previous images, for example between image patch 14 in the current image 10 shown in FIG. 7A, and the corresponding image patch 15 in the previous image 11 shown in FIG. 7B. More specifically, the 2-D translation is estimated to be the vector that minimizes the L1 difference between the projected vectors:

$$S_{Vk} = \min_i \left( \sum_y |V_{Pk}(y) - V_{Ck}(y - i)| \right)$$

$$S_{Hk} = \min_i \left( \sum_x |H_{Pk}(x) - H_{Ck}(x - i)| \right).$$

$S_{Vk}$ and $S_{Hk}$ are the minimum error terms for the vertical and horizontal offsets, respectively, for the k'th pair of patches. Corresponding to $S_{Vk}$ is a minimizing offest $i_{Vk}$, and to $S_{Hk}$ is an offset $i_{Hk}$. These offsets are components of a two-dimensional (2-D) local translation vector for the k'th patch offset. The 2-D translation vector is $(i_{Hk}, i_{Vk})$. From the complete set of local translation estimations, for all pairs of patches k, a vector field can be displayed, as shown in FIG. 3, which at every point 20 contains the calculated shift vector of the image patch centered at the k'th position. For example, there may be 13*27=351 points shown in the example of FIG. 3.

Based on the fourth assumption above, it is assumed that the center of the rotation is known. However, the center of rotation may alternatively be estimated from the vector field using a method such as the eight-point algorithm described by R. Hartley in "In Defense of the Eight-Point Algorithm," *IEEE Trans. on Pattern Anal. And Mach. Int. (PAMI)*, vol. 19, no. 6, pp 580-593, 1997), which is incorporated herein by reference.

Given the center of rotation, the local rotation is estimated at every point, calculating angles between the 2-D translation vectors for each pair of corresponding image patches by pointing from the center of rotation to the center of the image patch, or by pointing from the center of rotation to the end of the local translation vector.

Based on this local angle data and the local translation vector, the global rotation of the image can be estimated. A matrix is constructed containing the estimated rotation at every grid patch. The rotation values may not be the same for each grid patch due to perspective distortion, periodic structures in the image, noise, moving objects, and measurement errors. However, since these outliers are caused by noise and other factors, they result in an incoherent set of measurements, and the largest coherent set will provide the most robust estimate of the global rotation angle. Given an input image sequence having HD resolution (1080×1920 pixels), and calculating a vector field for 256×256 pixel patches with 75%-pixel overlap for a 13×27 grid of patches, as described above, for most scenes, more than half of the local rotation estimates are consistent with one another, even in sequences with many moving objects, periodic structures and non-negligible perspective distortion.

To filter out the outliers and identify the largest set, a trimmed mean calculation may be used, as described by P. Huber, *Robust Statistics*, John Wiley & Son, Inc., New York, (1981), which is incorporated herein by reference, (see section 1.3, page 9) to throw out the lower 30% and the upper 30% of the distribution. (see section 1.3, page 9) In a reduction to practice, the remaining 40% always belonged to the real rotation values and the mean of this set estimated the original rotation fairly well. Alternatively, one can use a sampling method such as RANSAC as described by M. Fischler and R. Bolles in "Random Sample Consensus: A Paradigm for Model Fitting with Applications to Image Analysis and Automated Cartography", *Communications of the ACM*, Vol. 24, No. 6, pp. 381-395, (1981), which is incorporated herein by reference. Such methods are more robust, tolerating a larger percentage of outliers, but requiring a large number of samples and model fitting to find a motion model with high consensus. In the reduction to practice, it has been observed that the proportion of outliers in the vector field is relatively small, which indicates that computationally intense methods such as RANSAC are unnecessary.

Once a global rotation angle is determined, then the proportional rotation vectors may be computed corresponding to each of the k displacement vectors $(i_{Hk}, i_{Vk})$ Subtracting each of the rotation vectors from their corresponding displacement vector, a new set of displacement vectors are obtained that are free of distortion from rotation. The last step is to obtain a final displacement for the total image $(i_H, i)$ where $i_H = Tr(i'_{Hk})$, $i_V = Tr(i'_{Vk})$ where $Tr( )$ is a trimmed mean calculation and $i'_{Hk}, i'_{Vk}$ are the displacement vectors corrected for rotation.

In the reduction to practice, the egomotion estimation performance of the present invention was qualitatively and quantitatively evaluated in comparison with other egomotion estimation methods. In all of the reduction to practice examples, the "ground truth" motion between the consecutive frames was taken to be a single global rotation of the image. It would be obvious to one with ordinary skill in the art to apply this invention to scenes that have both rotation and translation with similar performance results.

Figure 4A:
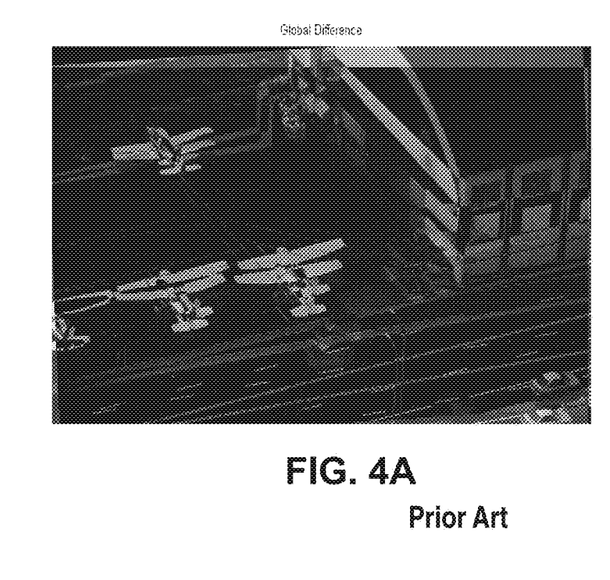
Figure 4B:
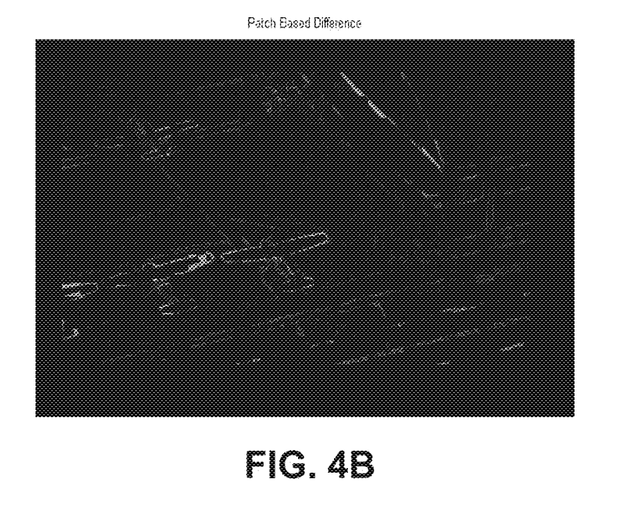
FIG. 4B shows an example difference between the current frame and the previous frame after transformation using a patch-based approach in accordance with the present disclosure.

The performance of the present invention was compared to a method that estimates a single global translation for the whole image. For each method, FIGS. 4A and 4B display for a pair of consecutive image frames from a Neovision2 dataset, the difference between the current image and the previous image, which has been transformed or corrected for translation. In FIGS. 4A and 4B, a single global translation was estimated for both images, even though there is some rotation between the two frames. In FIG. 4B the rotation between frames was modelled by translating each patch by the local translation vector, in accordance with the present invention. As FIG. 4A shows, a prior art method that estimates a single global translation cannot handle rotation and the difference image thus has more and more high values towards the right edge of the image, because rotation is larger in these regions. On the other hand, applying local translations to every image patch using the present invention, results in very few high intensity points at the edges of the airplanes and the building, as shown in FIG. 4B, indicating that the transformation of the pixels using the present invention has a superior performance.

Figure 5:
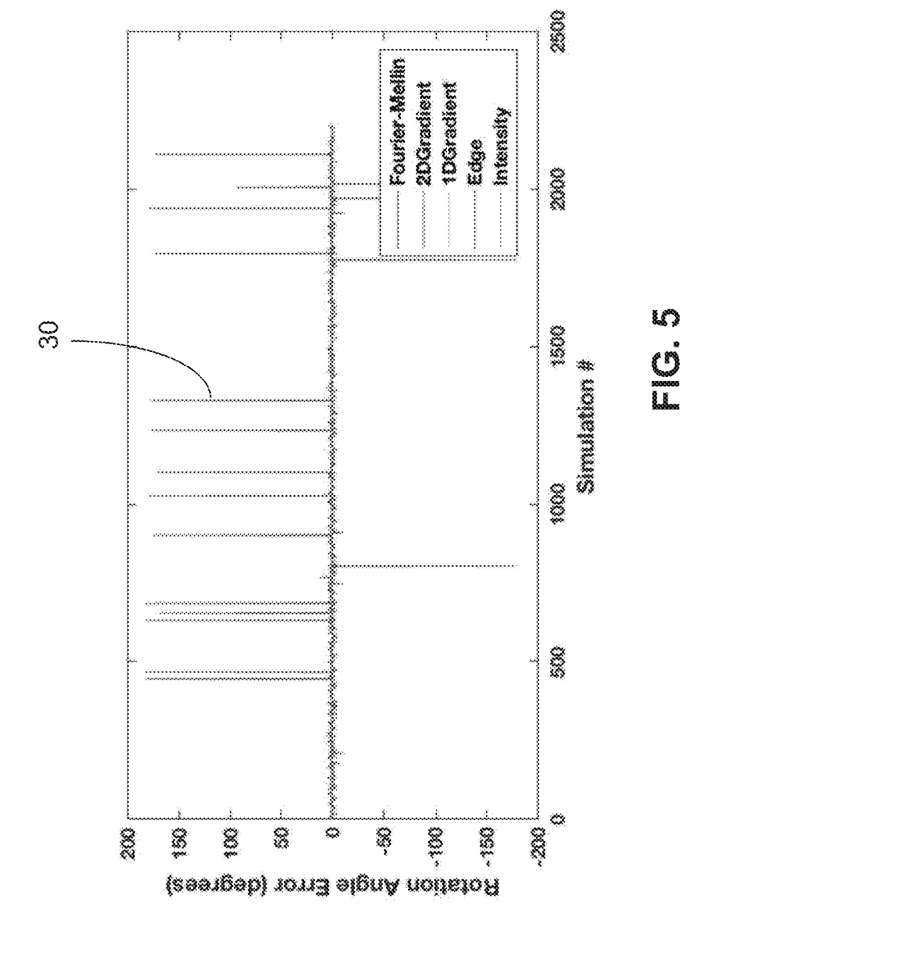
FIG. 5 shows example quantitative results comparing a method based on a prior art Fourier-Mellin (F-M) transformation with egomotion estimation in accordance with the present disclosure, showing in blue the rotation angle error for each of 2200 simulations using the prior art F-M based method, and showing in red the rotation angle error for each of 2200 simulations using the egomotion estimation in accordance with the present disclosure.
Figure 6:
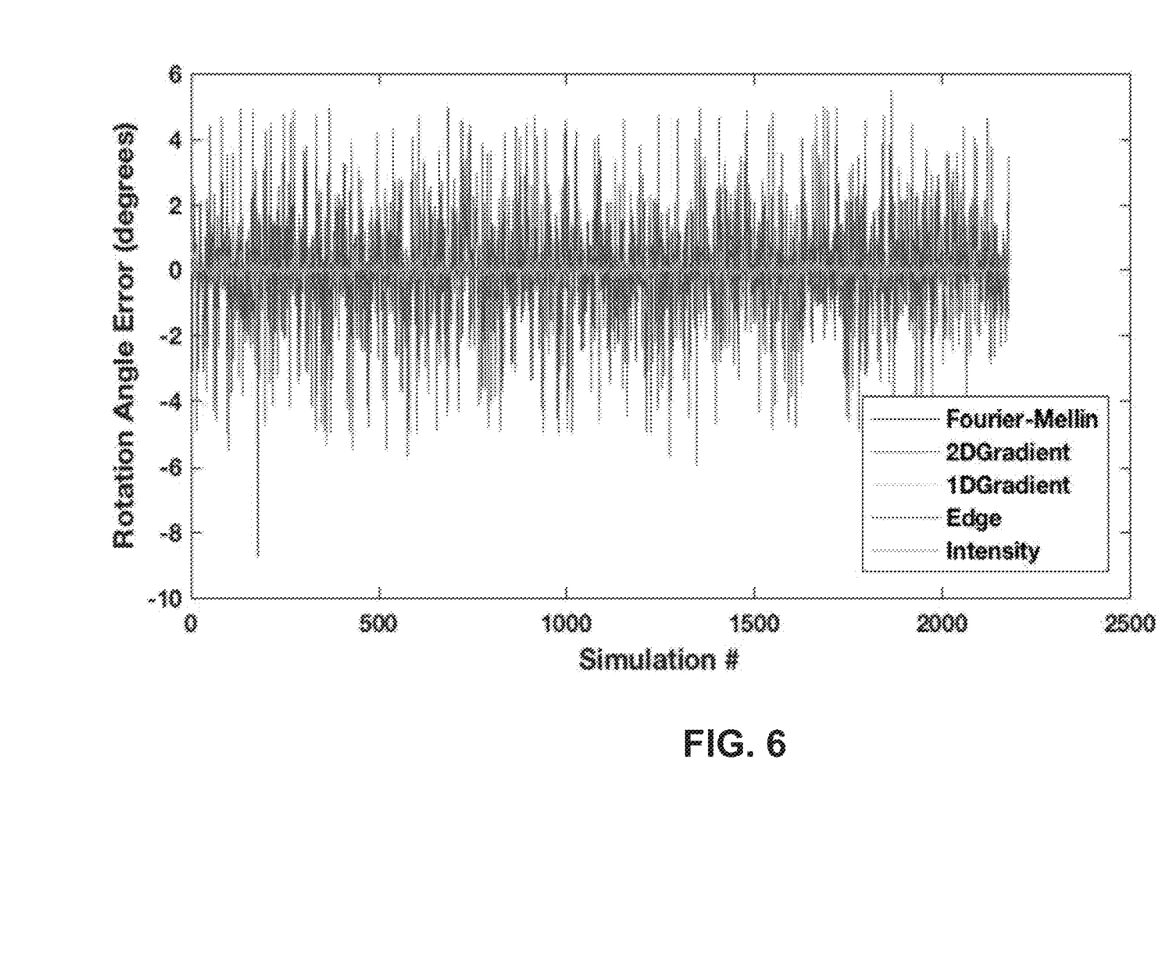
FIG. 6 shows the example quantitative results from FIG. 5 with the large errors from the prior art Fourier-Mellin (F-M) based approach filtered out, showing in blue the rotation angle error for each of the 2200 simulations using the prior art F-M based method, and showing in red the rotation angle error for each of the 2200 simulations using the egomotion estimation in accordance with the present disclosure.

The performance of the present invention was quantitatively measured using 22 images randomly selected from a Neovision2 Heli dataset. Because the ground truth egomotion between consecutive frames is not known in this dataset, each of the randomly selected images were synthetically rotated and translated. For each randomly selected image, the experiment was repeated 100 times with different randomly generated rotation angles and 2-D translation vectors, for a total of 2200 experiments. These 2200 experiments were repeated with four different types of edge processing, including one that simply retained the original intensity image. In FIGS. 5 and 6, these are labeled as follows: 2DGradient for a filter that computes the slope of image intensity in 2D; 1DGradient for a filter that computes the slope in one of either the x or y direction, (calculated orthogonally to the direction of the projection); Edge for a Sobel edge filter; and Intensity for the case where the image intensity is used directly. The average rotation angle error (root mean square error) of the estimated rotation was 0.27 degrees in these experiments, and the largest error was 0.72 degrees. The performance of the present invention shows that the invention is fairly robust and can be applied in practice to estimate image rotation in videos from aerial platforms.

The results were compared to an egomotion estimation method based on the prior art Fourier Mellin (F-M) transformation, as described by Wang, X. R., and Y. Ding in "An Image Registration Algorithm Based on Fourier-Mellin Transform and Feature Point Matching" *Multimedia, Communication and Computing Application: Proceedings of the 2014 International Conference on Multimedia, Communication and Computing Application (MCCA* 2014), Xiamen, China, Oct. 16-17, 2014. CRC Press, (2015), which is incorporated herein by reference, and which is a spectral method for estimating rotation, translation, and scale egomotion from a pair of consecutive image frames. The errors for the 2200 simulations using the F-M based egomotion estimation method are shown in FIG. 5 in blue. The average root mean square error of the F-M based egomotion estimation method was 17 degrees. This is likely because, the FM transformation is not robust to outlier motions, which may be caused my moving objects in the scene, when the motion between images is large. The errors for the 2200 simulations using the present invention are also shown in FIG. 5 in red, but aren't easy to see due to the gross errors of the prior art F-M based approach.

The rotation angle errors of our invention and the FM-based approach are comparable in many cases, but occasionally, the F-M transformation gives extremely poor egomotion estimation, as shown by the large errors 30—the blue spikes in FIG. 5. In a practical application, these large errors can be filtered out, because one can enforce temporal smoothness of motion between consecutive frames. For example, by assuming the image cannot turn upside-down from one frame to another.

To make a comparison using a temporal smoothness approach for the prior art F-M based approach, the gross errors in FIG. 5 where the rotation angle error for the F-M based approach was larger than 10 degrees have been removed in FIG. 6. However, even with this filtering, the root mean square error (RMSE) of the prior art F-M based method was 1.8311 degrees, and the highest error was 5.4945 degrees, as shown in FIG. 6 in blue. Meanwhile, the present invention required no filtering of gross errors and results are shown in FIG. 6 in red. It is noted that one could incorporate more robust techniques into the Fourier-Mellin transformation method, but this would require a significantly increased amount of computation, making the method infeasible for autonomous platforms with limited compute power.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A method for improving computational efficiency for egomotion estimation comprising:
    detecting a first image;
    detecting a second image, wherein the second image is detected at a time after detecting the first image;
    forming a first edge detected image from the first image;
    forming a second edge detected image from the second image;
    dividing the first edge detected image into a first set of first edge detected image patches;
    dividing the second edge detected image into a second set of second edge detected image patches, wherein the second edge detected image is divided into the second set of second edge detected image patches in the same manner as the first edge detected image is divided into the first set of first edge detected image patches;
    determining a local translation vector for each corresponding pair of a respective first edge detected image patch and a respective second edge detected image patch by computing correlations between projections of the respective first edge detected image patch onto a first respective vertical axis and a first respective horizontal axis and the respective second edge detected image patch onto a second respective vertical axis and a second respective horizontal axis to derive a set of local translation vectors;
    determining a center of rotation from the set of local translation vectors;
    using the center of rotation to estimate a local rotation angle for each local translation vector;
    estimating a global rotation angle by using the local rotation angles and the corresponding local translation vectors; and
    estimating egomotion by calculating a two dimensional translation vector between the second image and the first image.

2. The method of claim 1 wherein:
    computing correlations of projections of the respective first edge detected image patch onto a first respective horizontal axis and a first respective vertical axis and the respective second edge detected image patch onto a second respective horizontal axis and a second respective vertical axis further comprises:
    calculating for each first edge detected image patch $P_k$ the horizontal and vertical projections $$V_{pk}(y)=\Sigma_x E(P_k(x,y)) H_{pk}(x)=\Sigma_y E(P_k(x,y)); \text{ and}$$

calculating for each second edge detected image patch $C_k$ the horizontal and vertical projections $$V_{Ck}(y)=\Sigma_x E(C_k(x,y)) H_{Ck}(x)=E_y E(C_k(x,y));$$

where $V_{pk}$, $H_{pk}$ are vertical y and horizontal x projections of the kth patch from a previous edge image, and
wherein $V_{ck}$, $H_{ck}$ are vertical y and horizontal x projections of a corresponding kth patch $C_k$ from a current edge image.

3. The method of claim 2 wherein:
   determining a local translation vector for each corresponding pair of a respective first edge detected image patch and a respective second edge detected image patch by computing correlations between projections of the respective first edge detected image patch onto a first respective vertical axis and a first respective horizontal axis and the respective second edge detected image patch onto a second respective vertical axis and a second respective horizontal axis to derive a set of local translation vectors further comprises:
   minimizing an L1 difference between the projections by calculating $$S_{Vk} = \min_i \left( \sum_y |V_{Pk}(y) - V_{Ck}(y-i)| \right)$$

$$S_{Hk} = \min_i \left( \sum_x |H_{Pk}(x) - H_{Ck}(x-i)| \right)$$

where $S_{Vk}$ and $S_{Hk}$ are the minimum error terms for the vertical and horizontal offsets, respectively, for the k'th pair of patches;
   where corresponding to $S_{Vk}$ is a minimizing vertical offset $i_{Vk}$;
   where corresponding to $S_{Hk}$ is a minimizing horizontal offset $i_{Hk}'$;
   where these the minimizing vertical offset and minimizing horizontal offset are components of a two-dimensional (2-D) local translation vector for the k'th patch.

4. The method of claim 1 wherein using the center of rotation to estimate a local rotation angle for each local translation vector comprises:
   calculating an angle between a two-dimensional translation vector for each pair of corresponding image patches by pointing from the center of rotation to a center of the image patch, or by pointing from the center of rotation to the end of the local translation vector.

5. The method of claim 1 wherein estimating egomotion by calculating a two dimensional translation vector between the second image and the first image comprises:
   determining a horizontal and a vertical displacement for the second image ($i_H, i_V$);
   where $i_H = \text{Tr}(i'_{Hk})$, $i_V \text{Tr}(i'_{Vk})$; and
   where $\text{Tr}( )$ is a trimmed mean calculation and $i'_{Hk}$, $i'_{Vk}$ are the local translation vectors corrected for rotation.

6. The method of claim 1 wherein detecting the first image and detecting the second image comprise using a moving camera or a video camera.

7. The method of claim 1 wherein forming a first edge detected image from the first image and forming a second edge detected image from the second image comprises using an edge operator.

8. The method of claim 1 wherein:
   dividing the first edge detected image into a first set of first edge detected image patches comprises dividing the first edge detected image into a first set of overlapped first edge detected image patches; and
   dividing the second edge detected image into a second set of second edge detected image patches comprises dividing the second edge detected image into a second set of overlapped second edge detected image patches.

9. The method of claim 1 wherein:
   a change of scale between the first image and the second image is negligible.

10. The method of claim 1 wherein:
    a three dimensional perspective effect between the first image and the second image is negligible.

11. The method of claim 1 further comprising:
    deriving a maximum amount of translation between the first image and the second image from a speed of a platform used to detect the first image and the second image.

12. The method of claim 1 further comprising:
    using a frame rate greater than 30 frames/second for detecting the first image and for detecting the second image.

13. The method of claim 1 wherein:
    a global rotation angle between the first image and the second image is less than 20 degrees.

14. The method of claim 1 wherein:
    the center of rotation between the first image and the second image is around an optical center point.

15. A device for improving computational efficiency for egomotion estimation of a moving platform comprising:
    a camera mounted on the platform, the camera detecting a first image and detecting a second image, wherein the second image is detected at a time after detecting the first image; and
    a processor coupled to the camera, the processor configured to:
    form a first edge detected image from the first image;
    form a second edge detected image from the second image;
    divide the first edge detected image into a first set of first edge detected image patches;
    divide the second edge detected image into a second set of second edge detected image patches, wherein the second edge detected image is divided into the second set of second edge detected image patches in the same manner as the first edge detected image is divided into the first set of first edge detected image patches;
    determine a local translation vector for each corresponding pair of a respective first edge detected image patch and a respective second edge detected image patch by computing correlations between projections of the respective first edge detected image patch onto a first respective vertical axis and a first respective horizontal axis and the respective second edge detected image patch onto a second respective vertical axis and a second respective horizontal axis to derive a set of local translation vectors;
    determine a center of rotation from the set of local translation vectors;
    use the center of rotation to estimate a local rotation angle for each local translation vector;
    estimate a global rotation angle by using the local rotation angles and the corresponding local translation vectors; and
    estimate egomotion by calculating a two dimensional translation vector between the second image and the first image.

16. The device of claim 15 wherein:
    computing correlations of projections of the respective first edge detected image patch onto a first respective horizontal axis and a first respective vertical axis and the respective second edge detected image patch onto a second respective horizontal axis and a second respective vertical axis further comprises:
    calculating for each first edge detected image patch $P_k$ the horizontal and vertical projections $$V_{Pk}(y) = \Sigma_x E(P_k(x,y)) H_{Pk}(x) = \Sigma_y E(P_k(x,y)); \text{ and}$$

calculating for each second edge detected image patch $C_k$ the horizontal and vertical projections $$V_{Ck}(y)=\Sigma_x E(C_k(x,y)) H_{ck}(x)=\Sigma_y E(C_k(x,y));$$

where $V_{pk}$, $H_{pk}$, are vertical y and horizontal x projections of the kth patch from a previous edge image, and wherein $V_{ck}$, $H_{ck}$ are vertical y and horizontal x projections of a corresponding kth patch $C_k$ from a current edge image.

17. The device of claim 16 wherein:

determining a local translation vector for each corresponding pair of a respective first edge detected image patch and a respective second edge detected image patch by computing correlations between projections of the respective first edge detected image patch onto a first respective vertical axis and a first respective horizontal axis and the respective second edge detected image patch onto a second respective vertical axis and a second respective horizontal axis to derive a set of local translation vectors further comprises:

minimizing an L1 difference between the projections by calculating $$S_{Vk} = \min_i \left( \sum_y |V_{Pk}(y) - V_{Ck}(y-i)| \right)$$

$$S_{Hk} = \min_i \left( \sum_x |H_{Pk}(x) - H_{Ck}(x-i)| \right);$$

where $S_{Vk}$ and $S_{Hk}$ are the minimum error terms for the vertical and horizontal offsets, respectively, for the k'th pair of patches;

where corresponding to $S_{Vk}$ is a minimizing vertical offset $i_{Vk}$;

where corresponding to $S_{Hk}$ is a minimizing horizontal offset $i_{Hk}$;

where these the minimizing vertical offset and minimizing horizontal offset are components of a two-dimensional (2-D) local translation vector for the k'th patch.

18. The device of claim 15 wherein using the center of rotation to estimate a local rotation angle for each local translation vector comprises:

calculating an angle between a two dimensional translation vector for each pair of corresponding image patches by pointing from the center of rotation to a center of the image patch, or by pointing from the center of rotation to the end of the local translation vector.

19. The device of claim 15 wherein estimating egomotion by calculating a two dimensional translation vector between the second image and the first image comprises:

determining a horizontal and a vertical displacement for the second image $(i_H, i_V)$;

where $i_H = \text{Tr}(i'_{Hk})$, $i_V = \text{Tr}(i'_{Vk})$; and where Tr( ) is a trimmed mean calculation and $i'_{Hk}, i'_{Vk}$ are the local translation vectors corrected for rotation.

20. The device of claim 15 wherein detecting the first image and detecting the second image comprise using a moving camera or a video camera.

21. The device of claim 15 wherein forming a first edge detected image from the first image and forming a second edge detected image from the second image comprises using an edge operator.

22. The device of claim 15 wherein:

dividing the first edge detected image into a first set of first edge detected image patches comprises dividing the first edge detected image into a first set of overlapped first edge detected image patches; and dividing the second edge detected image into a second set of second edge detected image patches comprises dividing the second edge detected image into a second set of overlapped second edge detected image patches.

23. The device of claim 15 wherein the camera has a frame rate greater than 30 frames/second for detecting the first image and for detecting the second image.

* * * * *